Sept. 1, 1953 L. A. WENDEL 2,650,995
ENCLOSED CLUTCH-BRAKE MOTOR
Filed Jan. 28, 1952 2 Sheets-Sheet 1

WITNESS
η. Leszczak

INVENTOR.
Lorenz A. Wendel
BY
William P. Stewart
ATTORNEY

Patented Sept. 1, 1953

2,650,995

UNITED STATES PATENT OFFICE 2,650,995

ENCLOSED CLUTCH-BRAKE MOTOR

Lorenz A. Wendel, Somerville, N. J., assignor to The Singer Manufacturing Company, Elizabeth, N. J., a corporation of New Jersey Application January 28, 1952, Serial No. 268,597

6 Claims. (Cl. 310—76)

This invention relates to electric clutch-brake motors for driving machinery which must be repeatedly started and stopped. The invention relates more particularly to a heavy duty motor provided with an axially movable driven shaft and means to seal the motor against dirt.

An object of this invention is to provide a heavy duty clutch-brake motor which can withstand severe lateral thrust loads on the driven shaft.

Another object of the invention is to provide a heavy duty clutch-brake motor wherein both the clutch and the brake operate smoothly and quietly.

A further object of the invention is to provide a clutch-brake motor which is totally enclosed.

Another object of the invention is to provide a control mechanism for the clutch and brake which will assure a uniform clutch pressure.

A still further object of the invention is to provide a dirt seal for the motor through which the clutch and brake control mechanism can operate.

Figure 1:
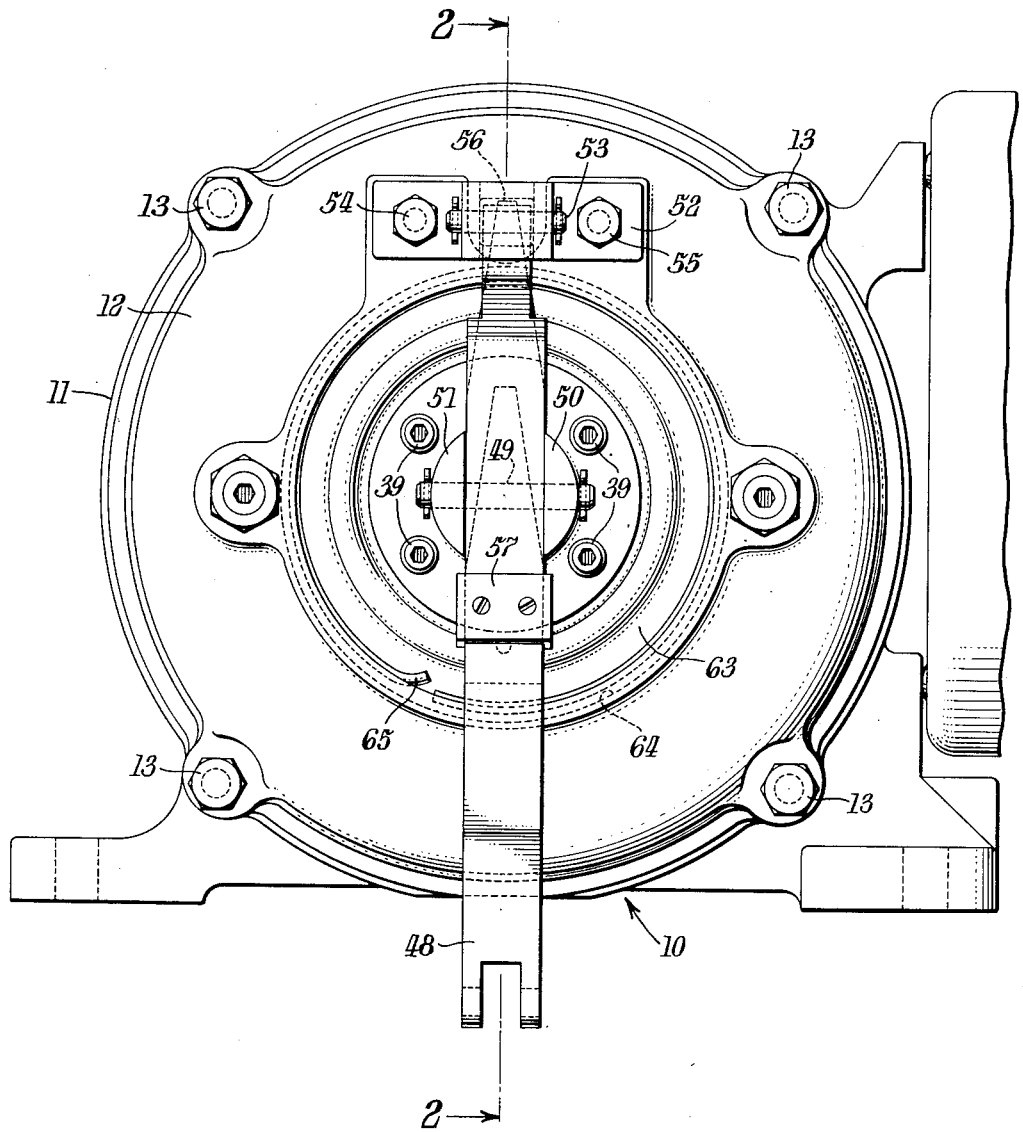

In the drawings, Fig. 1 is an end view in elevation of a clutch-brake motor embodying the invention.

Figure 2:
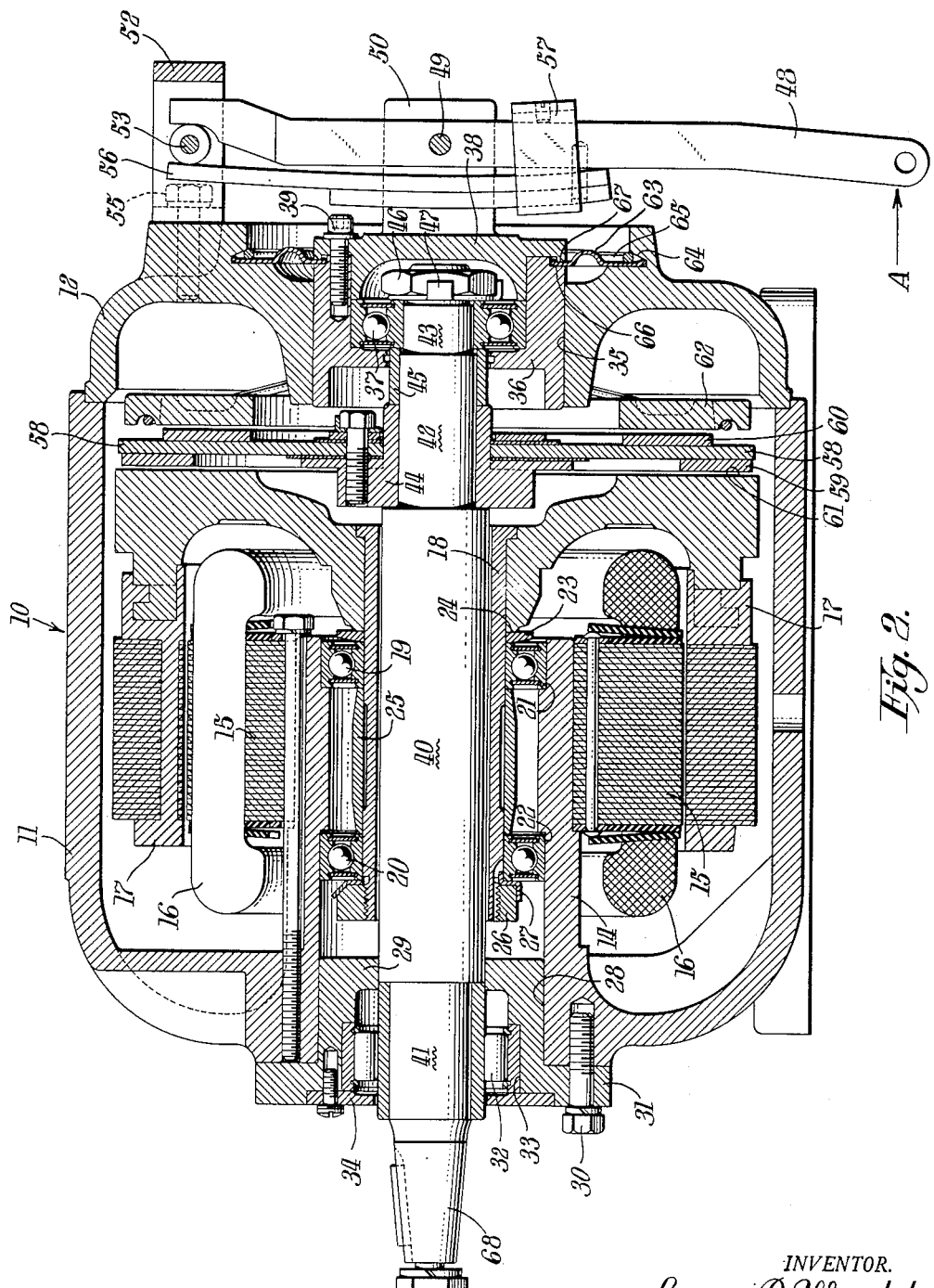

Fig. 2 is a sectional view of the motor taken on line 2—2 of Fig. 1.

Referring more specifically to the drawings, a motor frame or casing 10 is provided which includes a cylindrical housing 11 and an end closure 12 secured to the housing 11 by four bolts 13. A re-entrant tubular stator support 14 is formed integral with one end of the housing 11 and extends into the housing 11 substantially concentric with its cylindrical wall. The stator support 14 carries stator laminations 15 which are securely held in place on the support 14. A stator winding 16 is carried by the stator laminations 15 and is connected to a source of electric power (not shown). A rotor 17 surrounds the stator 15 and is fastened to a tubular shaft 18 which is journaled in bearings 19 and 20 carried by the stator support 14. The outer races of the bearings 19 and 20 abut against shoulders 21 and 22 formed in the inner surface of the stator support 14. The inner race of the bearing 19 bears against a thrust washer 23 seated against a thrust surface 24 formed on the rotor 17. A spacing sleeve 25 of substantially the same length as the distance between the shoulders 21 and 22 extends between the inner races of the bearings 19 and 20. A nut 26 is threaded onto the end of the shaft 18 and is held in place by a lock washer 27. The nut 26 can be drawn up securely without danger of damaging the bearings 19 and 20 because the spacing sleeve 25 transmits the force of the clamping action directly between the inner races of the bearings 21 and 22.

The end of the housing 11 which carries the stator support 14 is formed with a central aperture 28 which is closed by a bearing cap 29. The bearing cap 29 is secured in place by screws 30 which pass through a flange 31 formed on the bearing cap 29 and which are threaded into the housing 11. A heavy duty bearing 32 is fitted in a counterbore 33 formed in the bearing cap 29 and is held in place by a clamping ring 34 secured to the bearing cap 29. Similarly, the casing end closure 12 is formed with a central opening 35 alined with the central aperture 28 along the longitudinal axis of the casing 10. A bearing cup 36 is slidably mounted in the central opening 35 and is counterbored to form a seat for the outer race of a bearing 37. A closure cap 38 fits snugly into the counterbore in the bearing cup 36 and holds the bearing 37 securely in place when the bearing cap fastening screws 39 are tightened.

A driven shaft 40 is journally supported in the bearings 32 and 37. The shaft 40 is formed with a reduced diameter portion 41 at one end which carries the inner race of the heavy duty bearing 32. The other end of the shaft 40 is formed with a portion 42 of reduced diameter and a pilot portion 43 of still smaller diameter. A hub 44 and spacing collar 45 are fitted on the reduced diameter portion 42 and have a combined length slightly greater than the length of the reduced diameter portion 42 of the shaft 40. The pilot portion 43 of the shaft 40 enters the inner race of the bearing 37. A nut 46 threaded on the end of the driven shaft 40 and a lock washer 47 hold the bearing 37, spacing sleeve 45, and hub 44 in a fixed axial position on the driven shaft 40. Since the outer race of the bearing 37 cannot move axially in the bearing cup 36, the driven shaft 40 and the bearing cup 36 are also fixed axially relative to each other. Therefore, axial motion of the shaft 40 or the cup 36 results in corresponding axial motion of the other member.

Axial motion is imparted to the bearing cup 36 and driven shaft 40 by a lever 48 which is pivotally supported on a pivot pin 49. The pivot pin 49 is carried by two ears 50 and 51 which extend outwardly from the closure cap 38. Near the top of the housing end closure 12, a bracket 52 carrying a fulcrum pin 53 is attached to the end closure 12 by two screws 54 and 55. The fulcrum pin 53 is embraced between one end of the lever 48 and one end of a leaf spring 56 which is fastened to the lever 48 below the pivot pin 49 by a clamp 57. Pressure applied to the lower end of the lever 48 causes the lever to pivot about the fulcrum pin 53 and tend to move the bearing cup 36 and driven shaft 40 axially.

A thin disc 58 is fastened to the hub 44 carried by the driven shaft 40 and is provided with a friction clutch facing 59 on one side and a friction brake facing 60 on the other side. The clutch facing 59 is engageable with a smooth clutch surface 61 formed on one end of the rotor 17 while the brake facing 60 is engageable with a brake 62 carried by the end closure 12. The particular brake mounting may be of any well known type such as that shown in the Turner et al. Patent No. 2,510,917, dated June 6, 1950, and no further description thereof is believed to be necessary.

In previous devices of this type, considerable difficulty has been experienced with dirt working in between the sliding surfaces of the bearing cup 36 and the wall of the end closure central opening 35, resulting in rapid wear of the sliding surfaces. This invention embodies a seal between the bearing cup 36 and the end closure 12 to prevent the entry of dirt between these sliding surfaces. The seal consists of an annular flexible diaphragm 63 which has its outer peripheral edge positioned in a groove 64 which is substantially V-shaped in cross-section and concentric with the central opening 35 in the end closure 12. A spring snapring 65 is also positioned in the groove and holds the diaphragm 63 firmly in place. The mating surfaces of the bearing cup 36 and closure cap 38 are arranged to grip the inner edge of the flexible diaphragm between a shoulder 66 on the bearing cup 36 and a flange lip 67 on the closure cap 38. This structure permits the bearing cup 36 and driven shaft 40 to move axially a distance sufficient to engage the clutch facing 59 with the clutch surface 61 or the brake facing 60 with the brake 62 and yet protect the sliding surfaces against dirt. If, after long service, replacement of the diaphragm is necessary, the snap ring 65 is removed, the closure cap 38 removed and the diaphragm 63 replaced. The snap ring and closure cap are then replaced. None of the internal parts of the unit are disturbed.

Considerable difficulty has been experienced with rough and uneven clutch and brake engagement and the resulting "squeals" and "grunts" in prior motors of this general type. Much of this difficulty is the result of bending of the driven shaft occasioned by a severe lateral thrust force placed on the power delivery end of the shaft by the driven machine. I have overcome this difficulty by arranging the relative positions of the clutch, rotor, and power delivery end of the driven shaft in a particular manner. The power delivery end of the driven shaft 40 is provided with a tapered portion 68 to receive a gear or pulley, (not shown) which may be suitably connected to a driven machine (not shown). The lateral load force applied to the tapered portion 68 of the driven shaft 40 is carried primarily by the heavy duty bearing 32 located immediately adjacent to the tapered power delivery portion 68 and very little bending is produced in the driven shaft 40. Since the clutch element or surface 61 and brake 62 are located at the opposite end of the shaft 40 from the tapered portion 68 and immediately adjacent to the bearing 37, any slight bending which may occur in the shaft 40 will not materially affect the clutch and brake. Further, it should be noted that the rotor 17 is supported on the housing and cannot be affected by deflections of the driven shaft 40 if they should occur.

In operation, the unit is smooth and quiet. When pressure is applied to the lower end of the lever 48 in the direction of the arrow A in Fig. 2, the lever 48 pivots about the fulcrum pin 53 and draws the bearing cup 38 and driven shaft 40 to the right as viewed in Fig. 2, until the brake facing 60 is drawn firmly into engagement with the brake 62. The rotor is disengaged from the disc 58 and the disc and the driven shaft 40 are held stationary. When pressure is applied to the lower end of lever 48 opposite to the direction of the arrow A in Fig. 2, the bearing cup 38 and driven shaft 40 are moved to the left, as viewed in Fig. 2. This axial motion disengages the brake and causes the clutch facing 59 to engage the clutch surface 61 on the rotor 17. Under these conditions, the clutch facing 59 and clutch surface 61 are held yieldingly in engagement since the leaf spring 56 bears against the fulcrum pin 53 and flexes if heavy pressure is applied to the lever 48. This construction assures a constant correct pressure being applied to the clutch surfaces at all times when the clutch is engaged.

From the foregoing, it will be apparent that I have provided a compact clutch-brake motor which is effectively sealed against dirt and foreign matter. Further, the motor is capable of driving heavy machinery smoothly and quietly in a wide variety of motor applications.

Having thus set forth the nature of the invention, what I claim herein is:

1. An electric transmitter having a frame, a driven shaft having one end journaled in said frame for rotary and axial movement, a bearing cup slidably carried by said frame, a bearing fastened in said cup and supporting the other end of said driven shaft, means for moving said cup axially, and a flexible diaphragm surrounding said cup and fastened to said cup and to said frame.

2. An electric clutch-brake motor having a hollow casing, formed with an opening, said casing having a substantially V-shaped groove formed therein concentric with said opening, a slidable bearing cup positioned in said opening, a flexible diaphragm surrounding said cup and extending between said bearing cup and said casing, the inner edge of said diaphragm being fastened to said bearing cup and the outer edge of said diaphragm being positioned in said groove, and a snap-ring positioned in said groove and engaging said diaphragm.

3. An electric clutch-brake motor comprising a hollow casing having a central opening and a concentric groove in one end; a stationary stator carried by said casing; a rotor journaled in said casing concentric with said stator; a bearing cup slidably mounted in the opening in said casing; an annular flexible diaphragm having an inner edge fastened to said bearing cup and an outer edge positioned in said groove; a snap ring positioned in said groove and engaging said diaphragm; a driven shaft secured to said rotor and having one end journaled in said bearing cup; and means for sliding said bearing cup including means fastening said diaphragm to said bearing cup.

4. An electric clutch-brake motor comprising, a casing provided with an opening in one end and a groove formed therein concentric with said opening, a bearing cup slidably mounted in said opening, means for sliding said bearing cup, a flexible annular diaphragm having its inner edge fastened to said bearing cup and its outer edge fastened to said casing, a driven shaft having one end rotatably journaled in said bearing cup and fastened thereto against relative axial motion, the other end of said shaft being carried by said casing, a stator supported by said casing, a rotor carried by said casing having a clutch surface formed on one end, a brake carried by said casing, and a disc fastened to said driven shaft and positioned between said rotor and said brake and engageable with said rotor and brake.

5. An electric clutch-brake motor having a hollow casing a stator fastened to said casing, a tubular rotor shaft journaled in said casing concentric with said stator, a rotor fastened to said rotor shaft and surrounding said stator, a bearing cup carried by said casing and slidable toward the interior of said casing, means for sliding said cup, a driven shaft concentric with said rotor having one end journaled in said casing and the other end journaled in said bearing cup, means securing said driven shaft against axial movement relative to said cup, a clutch element carried by one end of said rotor adjacent to said bearing cup, a clutch disc fastened to said driven shaft between said clutch element and said bearing cup and engageable with said rotor clutch element, and a flexible diaphragm secured to said casing and said bearing cup.

6. An electric clutch-brake motor having a frame, a stator carried by said frame, a rotor journaled in said frame, a bearing carried by said frame, a bearing cup slidable in said frame, a driven shaft concentric with said rotor and having one end journaled in said bearing and the other end journaled in said bearing cup, means for sliding said cup, a dirt seal between said cup and said frame, a clutch disc fastened to said driven shaft between one end of said rotor and said bearing cup, a clutch element on said one end of said rotor and engageable by said disc, and power delivery means on said other end of said shaft.

LORENZ A. WENDEL.

References Cited in the file of this patent

UNITED STATES PATENTS

| Number | Name | Date |
| --- | --- | --- |
| 1,498,674 | Runge | June 24, 1924 |
| 1,639,684 | Bott | Aug. 23, 1927 |
| 2,550,908 | Bryant et al. | May 1, 1951 |